Figure 4:
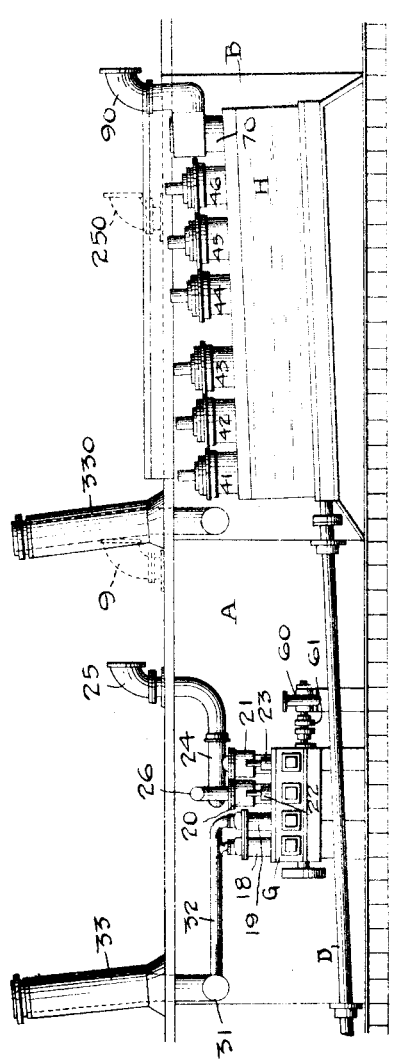

A. BÜCHI.
MARINE ENGINE PLANT.
APPLICATION FILED MAY 22, 1912.
1,051,308.
Patented Jan. 21, 1913.
2 SHEETS—SHEET 1.
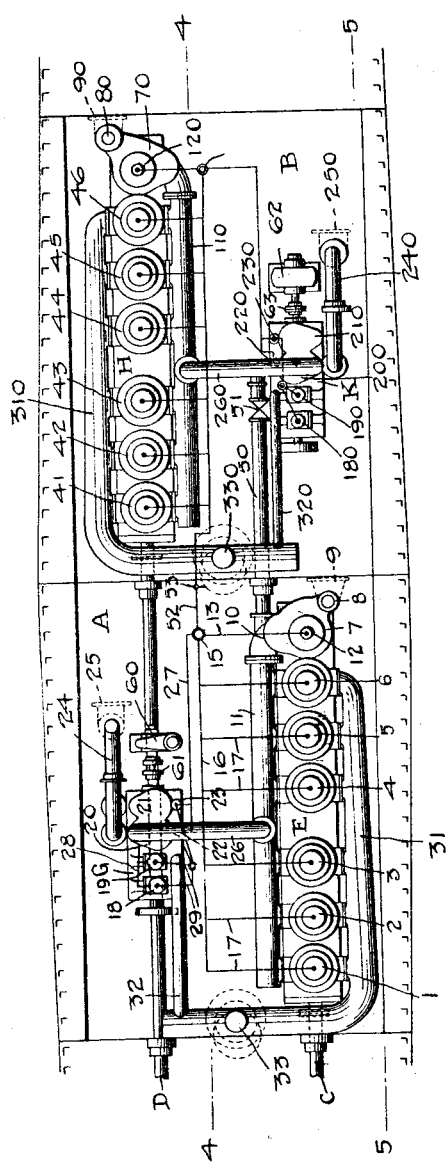
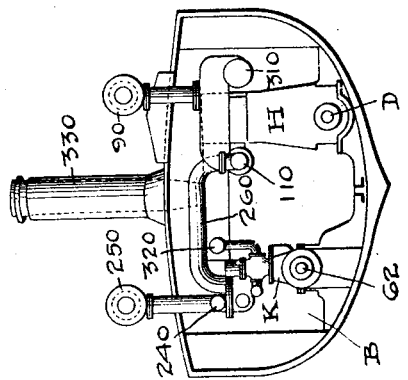
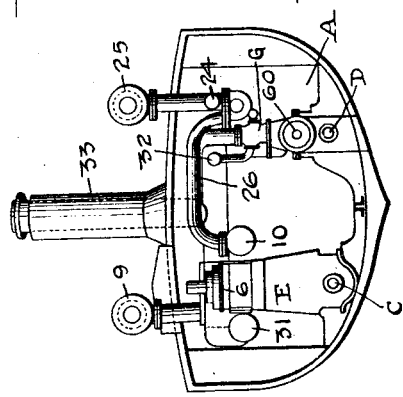
WITNESSES
INVENTOR
Alfred Büchi
BY
ATTORNEY

A. BÜCHI.
MARINE ENGINE PLANT.
APPLICATION FILED MAY 22, 1912.

1,051,308.

Patented Jan. 21, 1913.
2 SHEETS—SHEET 2.

WITNESSES

INVENTOR
Alfred Büchi
BY
ATTORNEY

UNITED STATES PATENT OFFICE.

ALFRED BÜCHI, OF WINTERTHUR, SWITZERLAND, ASSIGNOR TO BUSCH-SULZER BROS.-DIESEL ENGINE COMPANY, OF ST. LOUIS, MISSOURI, A CORPORATION OF MISSOURI.

MARINE-ENGINE PLANT.

1,051,308.     Specification of Letters Patent.     Patented Jan. 21, 1913.

Application filed May 22, 1912. Serial No. 699,067.

*To all whom it may concern:*

Be it known that I, ALFRED BÜCHI, engineer, a citizen of the Republic of Switzerland, and a resident of Winterthur, Canton of Zurich, Switzerland, have invented certain new and useful Improvements in Marine-Engine Plants, as hereinbelow described.

This invention relates more particularly to the constitution and arrangement of marine power plants in which propulsion is effected by Diesel or like constant pressure combustion engines, more especially of the two-stroke cycle type. As is known, the cylinders of such engines require to be supplied with air for scavenging, air to be compressed by the pistons and air to inject the fuel into such compressed and heated air and at times with air for starting or running the engine as a pneumatic engine. These supplies of air may be termed scavenging air, compression air, fuel air and starting air, respectively. The scavenging air and the compression air may be, and in fact are, one and the same; that is to say, at or about the conclusion of the power stroke air is caused to pass through the cylinder to sweep out the products of combustion, and the portion of this air remaining in the cylinder when the piston returns constitutes the air which is compressed by the piston to a high temperature in readiness for the injection into it of the fuel by the injection of fuel air. The scavenging air and compression air may, therefore, be derived from the same source, as a low compression pump. The fuel air is supplied by a high compression pump. The low and high compression pumps are customarily combined in a two or three stage air compressor of suitable design, the air for scavenging and compression in the cylinders of the engine being taken from the low pressure cylinder or cylinders of the pump, and the fuel or injection air being taken from a higher compression cylinder. As above stated, these engines also employ highly compressed air for starting, either to cause the engine to propel the vessel forward, or after stopping and suitable adjustment of the timing arrangements, to start the engine again in the reverse direction to propel the vessel backward. The air for starting and reversing may be compressed by the high compression cylinder or cylinders of the pump, at suitable times, into bottles or storage receptacles, which may be connected with the cylinders of the engine when needed to start the engine as an air engine. Customarily the pumps, or the multiple stage compressor, for supplying the engine with scavenging, compression and fuel air are direct connected with the engine. It is also known to drive all air compressors by auxiliary engines.

The object of the present invention is to divide the air supplying or compressing installations of the same kind or kinds between main and auxiliary power units. Thus, increased efficiency at different speeds may be secured, since the pump or pumps of the main engine may be of such capacity as to supply it with sufficient air up to a limit which may be, for example, either normal load or an underload, the auxiliary pumping outfit being brought into commission to supply the main engine with additional air for greater loads, that is, either to enable the main engine to run at normal load or at over-loads. In this way the power of the main engine is not consumed uselessly in driving a pump or pumps of larger size than is necessary for the limit of output previously determined upon, and consequently the engine may run with high efficiency at lighter as well as at heavier loads. Or, conversely, the main engine may be enabled to run at heavier loads than possible in prior arrangements where it pumps all its own air, because it is enabled to draw on an auxiliary independently driven equipment, without being burdened by an over-large direct-connected pump. It will be apparent that the main engine may be enabled to run at very considerable over-loads by making the capacity of the auxiliary pumping equipment as great as may be desired; but in all instances the main engine is capable of supplying itself with part or all of the air necessary for its functioning up to the predetermined limiting load. In effect, therefore, the present invention contemplates the combination with a Diesel engine of independent pumping provisions for supplying air of the same kind or kinds, one pump being driven by the main engine at speeds directly dependent on the speed of the engine, while the other pumping equipment may be operated at any suitable speed, in accordance with the needs and irrespective of the speed of the main engine.

A further advantage of the invention is that it provides a complete auxiliary pumping outfit, which may be drawn upon in event of partial or complete disablement of the pump of the main engine; this advantage not being dependent on any particular relation between the capacities of the two pumping equipments.

Either of the pumps may be used to compress air for starting and reversing, and it will be an advantage to employ the auxiliary pumping unit for this purpose.

Preferably a power plant of the character described is assigned to the driving of each propeller shaft, and there may be as many of these power plants on board ship as there are propellers. Each propelling engine and the corresponding auxiliary pumping unit are located in the same water-tight compartment. The water-tight compartments, each containing a power plant of the character described, are located in series fore and aft of the vessel; and preferably the auxiliary pumping unit of a rearward compartment is disposed over the propeller shaft extending from the compartment in advance.

A further feature of the invention resides in the provision of an intercommunicating connection between the air-supplying provisions of these Diesel engine power plants located in different water-tight compartments so that the engine of any compartment may be supplied by the pumping apparatus of a different compartment in event of partial or complete disablement of the pumping apparatus in its own compartment.

Other features and the various advantages of the invention will be apparent to those skilled in this art from the accompanying drawings, which illustrate the principles of the invention in a suitable specific embodiment.

Figure 5:
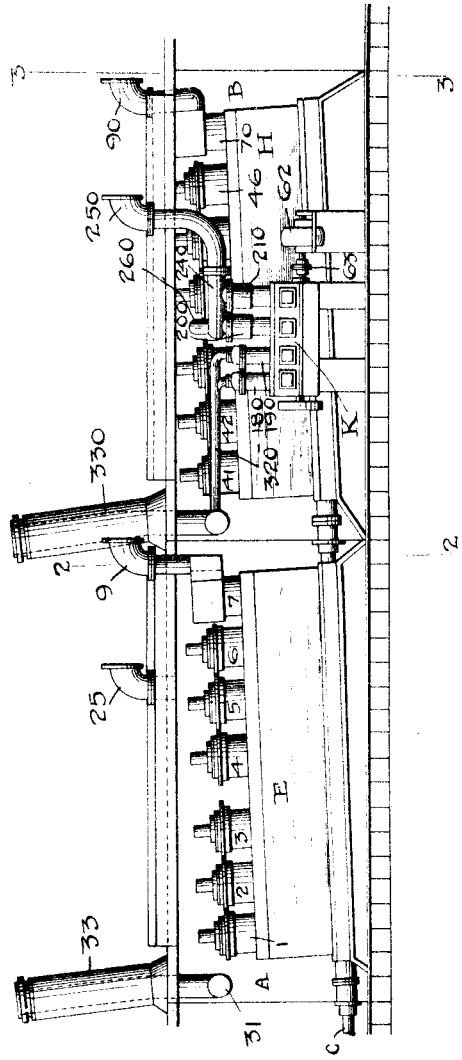

In these drawings, which are somewhat diagrammatic: Figure 1 is a sectional plan view through two water-tight compartments of a vessel, showing the power plants located therein and the driven propeller shafts; Fig. 2 is a cross-section on the line 2—2 of Fig. 5; Fig. 8 is a cross-section on the line 3—3 of Fig. 5; Fig. 4 is a longitudinal section on the line 4—4 of Fig. 1; and Fig. 5 is a longitudinal section on the line 5—5 of Fig. 1.

Various connections shown in Fig. 1 are omitted from the other views for the sake of clearness.

The letters A and B indicate two water-tight compartments formed in the interior of the vessel in any suitable or usual manner. C and D are two propeller shafts. The shaft C is driven by an engine E of the two-cycle Diesel type located in the compartment A. The said engine is shown as consisting of six working cylinders, numbered 1, 2, 3, 4, 5, 6. The cylinders of this engine are located directly over the propeller shaft, and its pistons are connected with cranks thereon. The construction of the engine is not illustrated in detail because the principles thereof are well understood. The engine E also has a direct-connected pump 7, adapted to supply it with scavenging and compression air. The numeral 8 indicates the intake for this pump, having a cowl 9 above deck; and 10 is the discharge for the scavenging and compression air, the same being delivered to a receiver or manifold 11 extending longitudinally of the series of working cylinders and connected with suitably located ports in the sides thereof. Preferably the pump 7 is designed also to supply the engine E with more highly compressed air for the injection of the fuel. To this end it is indicated as provided with a high compression cylinder 12, from which a pipe 13 leads to a control valve 15 of any suitable character, through which the injection air may be transmitted to the various fuel valves of the engine, which valves may be located in the tops of the cylinders under the control of the valve-gearing, not shown. The diagrammatic arrangement shown indicates a receiver or manifold 16 extending from the control valve 15 and connected with the several fuel ports of the cylinders by branches 17. The pumping cylinders 7 and 12, with their pistons may be represented by separate pumps direct-connected to the engine E, but for compactness they are preferably embodied in a tandem-arranged, multiple-stage compressor of the usual type.

In the same water-tight compartment A is an auxiliary pumping unit G, arranged independently of the propeller shaft C. As shown, the main engine E with its direct-connected pump and the auxiliary pumping unit G may be arranged at opposite sides of the longitudinal center-line of the compartment; and preferably the auxiliary pumping apparatus is located over the propeller shaft D leading from the compartment B. The pumping apparatus G is indicated as including two working cylinders 18 and 19 of a two-cycle Diesel engine, two relatively low compression pumping cylinders 20 and 21, and two high compression pumping cylinders 22 and 23. As in the case of the main engine the pumps are preferably direct-connected to the auxiliary engine G, and the low and high compression cylinders are preferably embodied in a familiar form of multiple-stage compressor. 24 indicates the intake pipe for this compressor, the same having a cowl 25 above deck; and 26 is a conduit leading from the low compression cylinders to the receiver 11, from which the working cylinders of the main engine E are supplied with scavenging and compression air. Thus, the auxiliary pumping unit G may supply the engine E with additional air for scavenging and compression or with all its scavenging and compression air, if necessary, and up to a suitable limit dependent on the capacity of the auxiliary apparatus. The auxiliary apparatus, however, is also designed to supply the main engine with additional fuel air, or even with its entire supply of fuel air. To this end the high compression cylinders 22, 23 are connected by pipe 27 with the control valve 15 and hence with the various fuel ports of the engine E. The illustration is diagrammatic and will be understood as being merely suggestive of a suitable arrangement but will be sufficient for the skilled engineer. The auxiliary engine G by means of its pumps is capable of supplying itself with air for scavenging, compression and fuel injection, as well as of supplying the main engine E with air in addition to that supplied by the pump 7. To this end, the outlets of the low compression cylinders 20 and 21 may be connected with suitable ports in the working cylinders 18 and 19 by means of a pipe or manifold diagrammatically represented by the line 28, and the high compression cylinders 22, 23, may be connected with the fuel valves of the cylinders 18 and 19 by a pipe 29 leading thereto. Obviously, the auxiliary pumping unit G may supply its working cylinders with injection air and fuel by way of the conduit 27, if desired and under the control of the valve 15.

It will be understood that valves are provided wherever desirable, to cut off any part of the dual air supply system when such part is not in use. Inasmuch as the provision of such cut-off means is merely a matter of judgment, the drawing is not complicated by representation thereof.

The exhaust manifold 31 of the propelling engine E and the smaller manifold 32 of the working cylinders of the auxiliary pumping unit G preferably lead to the same outlet and funnel 33.

The arrangement of the parts of the power plant in the forward water-tight compartment B may be and preferably is similar to that in the compartment A, except that the positions of the main and auxiliary units are here reversed. The propelling engine in this compartment is lettered H, and its six working cylinders are marked, respectively, 41, 42, 43, 44, 45, 46. It also has a direct-connected pump 70, having an intake 80, with cowl 90 above deck and adapted to deliver scavenging and compression air to ports in the sides of the working cylinders of the engine by way of a receiver or manifold 110. It is also shown as provided with a high compression cylinder 120, connected to supply the fuel ports of the working cylinders with fuel. The connections diagrammatically indicated for this purpose are similar to those in the compartment A, and will not, therefore, be described a second time. The auxiliary pumping unit K in this compartment has the two working cylinders 180 and 190, two low compression cylinders 200 and 210 and two high compression cylinders 220 and 230. A cross conduit 260 for scavenging and compression air leads from the outlet of these low compression cylinders to the receiver or manifold 110 of the main engine H. The illustrated connections whereby the high compression cylinders of the auxiliary unit K supply the working cylinders of the main engine with injection air and fuel, as well as the arrangements whereby the unit K supplies its working cylinders with scavenging, compression and injection air, are similar to those described in connection with the compartment A. 240 indicates the intake to the multiple stage pump of the unit K, the same being provided with a cowl 250 above deck. As before, the exhaust 310 of the main engine and the exhaust 320 of the auxiliary engine lead to a common funnel outlet 330.

Intercommunicating means between the air supplies of the power plants in separate compartments are provided by means of a conduit 50 extending through the watertight bulkhead between compartments A and B and connecting the receiver 11 of compartment A with the cross conduit 260 of the compartment B. This intercommunicating conduit 50 is controlled by a cut-off valve 51. Thus in event of partial or complete disablement of the scavenging and compression air supply apparatus in either of the compartments the propelling engine thereof may be served by the apparatus in the other compartment. By virtue of there being complete auxiliary pumping equipment in each compartment the amount of air supplied by the apparatus in one compartment only may be sufficient to enable the propelling engines of both compartments to run at a not too reduced speed. In like manner the high compression pumps of the two compartments may be interconnected each with the engine of the other compartment. For this purpose a pipe 52, controlled by a valve 53, connects the high pressure fuel air line of compartment A with that in compartment B.

The auxiliary engines G and K of the two compartments, in addition to their pumps, may drive any suitable apparatus. Thus, the engine G is shown, for instance, as adapted to be connected with a rotary pump 60 of any suitable character, as by means of a clutch or coupling 61; and the auxiliary engine K may be coupled with a dynamo 62, by means of a suitable clutch or connection 63.

It will be observed that distinct power plants are provided, contained in separate water-tight compartments, each being capable of propelling the vessel independently of the other.

The operation will be described with reference to the power plant contained in the compartment A, since this description will apply equally to similar apparatus in the compartment B.

The pump 7 direct-connected to the propelling engine E is designed so as to be capable of supplying the working cylinders of the latter with air for scavenging and compression up to a suitable predetermined limit. This limit may be normal load, or even an over-load, but preferably it is an under-load, so that the propelling engine is enabled to pump all the air it needs for scavenging and compression for low speeds, without calling upon the auxiliary pumping unit. Preferably, also, the propelling engine, by virtue of the high compression cylinder 12, is capable of compressing its own fuel or injection air; and it is desirable to proportion the high and low compression cylinders and pumps driven by the propelling engine so that they are capable of supplying the latter with both high and low compression air up to the same limiting load previously determined upon. The auxiliary pumping unit G may be employed merely as a reserve or emergency equipment, to be drawn upon in event of partial or complete disablement of the pump or pumps driven by the propelling engine, or in event of it becoming necessary to develop extraordinary speeds (over-loads). Preferably, however, the auxiliary pumping unit G is designed to supplement the pumping equipment driven by the propelling engine itself, so as to enable the said propelling engine to run at loads which may be regarded as normal but greater than the limit determined by the capacity of the pump 7. That is to say, the auxiliary engine, which is not running at low speeds of the main engine may be started up when it is desired to run the main engine at normal load or speed.

It will be understood that water-tight bearings and joints are provided where shafts and pipe connections pass through the partition or partitions separating water-tight compartments.

I claim,

1. In a marine power installation, the combination of a main Diesel engine to propel the vessel, two air supply plants of the same kind for supplying said main Diesel engine with the air for its operation as an internal combustion engine, one of said air supply plants being driven by the main engine and being proportioned to supply said engine with the necessary air up to a predetermined limiting load below which the other air supply plant is unnecessary and may stand idle, and an auxiliary Diesel engine of smaller power development than the main engine for driving said other air supply plant when there is a demand on the main engine in excess of said limiting load.

2. In a ship, in combination with the propeller shafts and water-tight compartments one behind the other, of a propelling engine of the two-cycle Diesel type with an air pump in each compartment, and an auxiliary pumping unit in each compartment with connections for supplying the propelling engine in the same compartment with additional air when necessary, the auxiliary unit of the rearward compartment being disposed over the propeller shaft leading from the forward compartment.

In testimony whereof, I have signed this specification in the presence of two witnesses.

ALFRED BÜCHI.

Witnesses:
CARL GUBLER,
AUGUST RÜEGG.

Copies of this patent may be obtained for five cents each, by addressing the "Commissioner of Patents, Washington, D. C."